United States Patent [19]

Holub et al.

[11] 3,755,354

[45] Aug. 28, 1973

[54] AMIDE ACID AND IMIDO-SUBSTITUTED ORGANOSILANES

[75] Inventors: Fred F. Holub; Milton L. Evans, both of Schenectady, N.Y.

[73] Assignee: General Electric Company, Schenectady, N.Y.

[22] Filed: Dec. 15, 1970

[21] Appl. No.: 98,463

Related U.S. Application Data

[62] Division of Ser. No. 821,869, May 5, 1969, Pat. No. 3,576,031.

[52] U.S. Cl. .................. 260/326 E, 260/326.5 A
[51] Int. Cl. .................. C07d 27/18, C07d 27/52
[58] Field of Search .................. 260/326 E, 326.5 A

[56] References Cited
UNITED STATES PATENTS 2,795,589   6/1957   Bluestone .......................... 260/326

*Primary Examiner*—Joseph A. Narcavage
*Attorney*—Richard R. Brianard, Joseph T. Cohen, Paul A. Frank et al.

[57] ABSTRACT

Organosilanes are provided having at least one chemically-combined aliphatically unsaturated imido organic radical, such as a maleimido-substituted organosilane and a method for making these materials. For example, reaction can be effected between an aliphatically unsaturated dicarboxylic acid anhydride and an aminoorganoalkoxysilane. In certain instances, amido acid precursors of such unsaturated imido-substituted organosilanes also can be made. The aliphatically unsaturated imido-substituted organosilanes of the present invention can be employed to impart improved surface characteristics to cellulosic substrates and to make aliphatically unsaturated imido-substituted organopolysiloxanes.

7 Claims, No Drawings

AMIDE ACID AND IMIDO-SUBSTITUTED ORGANOSILANES

This application is a division of copending application Ser. No. 821,869 filed May 5, 1969, now U.S. Pat. No. 3,576,031.

The present invention relates to organosilanes having at least one aliphatically unsaturated imidoorganic radical and methods for making these materials.

The aliphatically unsaturated imido-substituted organosilanes of the present invention have the formula, (1)
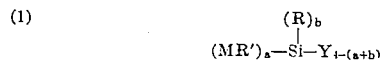

where R is selected from monovalent hydrocarbon radicals, halogenated monovalent hydrocarbon radicals and cyanoalkyl radicals, R' is selected from divalent hydrocarbon radicals and halogenated divalent hydrocarbon radicals, Y is a hydrolyzable radical and M is an aliphatically unsaturated imido radical of the formula, (2)

where R'' is an aliphatically unsaturated divalent organic radical selected from hydrocarbon radicals and halogenated hydrocarbon radicals, $a$ is an integer equal to from 1 to 3 inclusive and $b$ is a whole number equal to 0 to 2 inclusive and the sum of $a+b$ is equal to 1 to 3 inclusive.

Radicals included by R of formula (1) are, for example: aryl radicals such as phenyl, chlorophenyl, naphthyl, tolyl, xylyl, etc.; alkyl radicals such as methyl, ethyl, propyl, butyl, pentyl, hexyl, heptyl, octyl, etc.; alkenyl radicals such as vinyl, allyl, propenyl, etc.; cycloaliphatic radicals such as cyclopentyl, cyclohexyl, cycloheptyl, cylcohexenyl, etc.; cyanoalkyl radicals such as cyanoethyl, cyanopropyl, cyanobutyl, etc. Radicals included by R' are, for example: arylene radicals such as phenylene, xylylene, naphthylene, anthrylene, etc.; halogenated aryl radicals such as chlorophenylene, bromophenylene, chloronaphthylene, etc.; arylenealkylene radicals such as ethylenephenylene, ethylenexylylene, propylenephenylene, etc.; alkylene radicals such as methylene, ethylene, propylene, butylene, pentylene, etc. Radicals included by R'' are, for example:

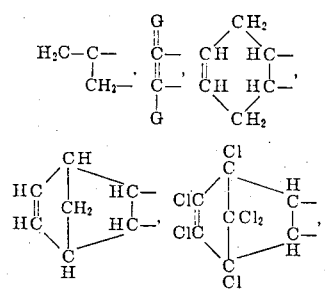

etc., where G is selected from hydrogen, halogen and methyl. Radicals included by Y are, for example: halogen radicals such as chloro, bromo, iodo, fluoro, etc.; alkoxyl and aryloxy radicals such as methoxy, ethoxy, propoxy, butoxy, phenoxy, etc.; amido radicals such as methylamido, ethylamido, propylamido, etc.; imidato radicals such as ethyl acetimidato, methylpropionimidato, etc.; aminoxy radicals such as N,N-diethylaminoxy, N,ethyl-N,methyldiaminoxy, dipropyl N-aminoxy, etc.; amino radicals such as methylamino, dimethyl-amino, ethylamino, diethylamino, propylamine, etc.; acyloxy radicals such as formoxy, acetoxy, propionoxy, etc. Radicals included by R, R', R'' and Y, can be all the same, or any two or more of the aforementioned radicals respectively.

Included by the imido-substituted organosilanes of formula (1) are, for example:
γ-maleimidopropyldimethylmethoxysilane,
δ-tetrahydrophthalimidobutylphenyldimethoxysilane,
γ-maleimidopropyl)(ethylacetimidato)dimethylsilane,
γ-endomethylenetetrahydrophthalimidopropyltolyldichlorosilane,
γ-maleimidopropyltriethoxysilane,
β-maleimidophenyltriethoxysilane,
γ-tetrahydrophthalimidopropyl, bis-(diethylaminoxy)ethoxysilane,
γ-maleimidopropyldimethylchlorosilane,
δ-maleimidobutyl(acetamido)dimethoxysilane,
δ-endomethylenetetrahydrophthalimidobutyl, bis-(ethylacetimidato)isopropoxysilane,
δ-maleimidopropyltriacetoxysilane, etc.

The imido-substituted organosilanes of formula (1) can be utilized to treat various cellulosic substrates to improve the surface characteristics thereto. They also can be employed as coupling agents on glass fibers to provide for glass fiber-organic polymer composites. In addition, the imido-substituted organosilanes can be used to make organopolysilanes polymers as taught in our copending application, filed concurrently herewith and assigned to the same assignee as the present invention.

One method for making the imido-substituted organosilanes of formula (1), is by effecting reaction between an aminoorganoalkoxysilane of the formula, (3)
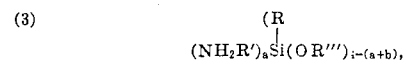

and an aliphatically unsaturated anhydride of the formula, (4)

where R, R', R'', Y, $a$ and $b$ are as defined above and R''' is a lower alkyl radical such as methyl, ethyl, propyl, butyl, etc. At temperatures below 60°C, and preferably 0° to 40°C, the corresponding amide-acid is obtained, as shown by the following formula,

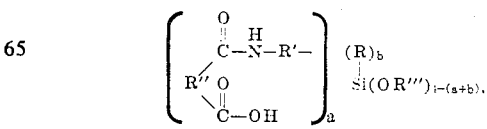

where R, R'', R''', a and b are as previously defined. These amide-acids can be employed as primers for coating organic polymers onto various substrates. In addition, these amide-acid substituted organosilanes can be employed as curing agents for room temperature vulcanizing composition.

Another method which can be utilized to make the imido-substituted organosilanes of formula (1), is by effecting addition between a silicon hydride of the formula, (5)

where X is a halogen radical, such as chloro, bromo, iodo and fluoro, and an imido-substituted aliphatically unsaturated organic material of the formula, (6)
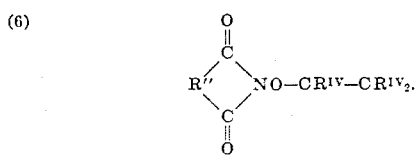

where R'' is as previously defined, Q is a divalent organic radical included by R', as previously defined, and $R^{IV}$ is selected from hydrogen and monovalent alkyl radicals, for example, methyl, ethyl, propyl, etc. Some of the imido-substituted aliphatically unsaturated materials and a method for making them are taught by Prell, U.S. Pat. No. 2,524,136.

There are included by the aminoorganoalkoxysilane of formula (3), γ-aminopropyltriethoxysilane, δ-aminobutyldimethylmethoxysilane, γ-aminopropylmethyldiethoxysilane, γ-aminopropyldimethylmethoxysilane, γ-aminopropylphenylmethylethoxysilane, and p-aminophenyltriethoxysilane.

Among the aliphatically unsaturated anhydride of formula (4), there are included, maleic anhydride, tetrahydrophathalic anhydride, endomethylenetetrahydrophathalic anhydride, citraconic anhydride, itaconic anhydride, hexachloroendomethylenetetrahydrophthalic anhydride, etc.

The silicon hydrides of formula (5) are well known and include, for example, dimethylchlorosilane, trichlorosilane, diphenylchlorosilane, methylchlorosilane, methyldichlorosilane, phenyldichlorosilane, etc.

Included by the imido-substituted aliphatically unsaturated materials are p-maleimido-styrene, δ-tetrahydrophthalimidobutene-1, γ-endomethylenetetrahydrophthalimidopropene-1, etc. These aliphatically unsaturated imido organic materials can be made by effecting reaction between the corresponding olefinically unsaturated organic amine and the aliphatically unsaturated anhydride of formula (4).

Reaction between the aminoorganoalkoxysilane of formula (3), and the aliphatically unsaturated anhydride of formula (4) can be performed in the presence or absence of an organic solvent depending upon the nature of the reactants. Temperature between 60° to 200°C can be employed. Reaction times of as little as 2 minutes or up to 4 hours or more, will depend on such factors as the reactants employed, conditions utilized, presence or absence of solvents, dehydrating agents, etc. A suitable organic solvent has in particular instances been found to facilitate the removal of water formed during the anhydride-amine condensation which can be azeotroped from the mixture. A suitable organic solvent is any solvent inert to the reactants water from the mixture. For example, there are included organic solvents, such as N, N-dimethylformamide, toluene, benzene, pyridine, etc.

When effecting addition between the imido-substituted aliphatically unsaturated organic material of formula (6), and silicon hydride of formula (5), a platinum catalyst can be employed such as platinum metal on a finely divided inert carrier, chloroplatinic acid, a platinum-olefin complex as taught in Ashby, U.S. Pat. No. 3,159,601, assigned to the same assignee as the present invention, etc. Addition can be effected at a temperature between 20° to 200°C.

In order that those skilled in the art will be able to understand how to practice the invention, the following examples are given by way of illustration and not by way of limitation: all parts are by weight.

EXAMPLE 1

A mixture of 4.4 parts of γ-aminopropyltriethoxysilane, 1.96 parts of maleic anhydride, about 60 parts of hexane and 0.1 part of pyridine was refluxed. Reflux was continued until all of the water formed during the reaction was evolved. The mixture was then stripped of hexane under reduced pressure. A soft white solid was obtained. Based on method of preparation, the product was γ-maleimidopropyltriethoxysilane. Its identity was confirmed by its infrared and NMR spectra.

EXAMPLE 2

An equal molar mixture of maleic anhydride and γ-aminopropyltriethoxysilane was stirred while maintaining the temperature below 40°C. The mixture was prepared by slowly adding the maleic anhydride to the γ-aminopropyltriethoxysilane. Exothermic heat of reaction was removed with external cooling. After an hour of stirring, the mixture was allowed to cool to room temperature. There was obtained a slightly viscous liquid. Based on method of preparation and its infrared spectrum, the product was an amide-acid of the formula,

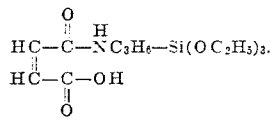

A mixture of 7 parts of the above amide-acid, 100 parts of a silanol terminated polydimethylsiloxane having a viscosity of about 3,000 centipoises of 25°C and 0.23 part of zirconium pentanedionate is prepared under anhydrous conditions. The mixture is poured onto an aluminum substrate and allowed to cure under atmospheric conditions. After 24 hours a tack-free elastomer is obtained which has valuable insulating properties.

EXAMPLE 3

A suspension of N-allylmaleimide and toluene was prepared containing 0.0028 parts of platinum in the form of a chlorolatinic acid-octyl alcohol complex. A mixture of 27.4 parts of N-allylmaleimide, 100 parts of toluene and the platinum catalyst was heated with stirring to 80°C. There was then added 2.19 parts of dimethylchlorosilane to the resulting suspension. A exothermic reaction resulted during the addition, while the temperature was maintained between 85° to 90°C. The mixture was then stirred for an additional hour. The mixture was then stripped of toluene under reduced pressure. There was obtained a quantitative yield of γ-maleimidopropyldimethylchlorosilane based on method of preparation. The identity of the product was further confirmed by its infrared spectrum.

EXAMPLE 4 p-aminophenyltriethoxysilane is prepared by the method of Fleming, U.S. Pat. No. 2,386,452. There is added two parts of pyridine to a mixture of 25 parts of the p-aminophenyltriethoxysilane and 100 parts of anhydrous toluene. To the resulting mixture, there is added a solution of 25 parts of toluene and 9.8 parts of maleic anhydride. The mixture is allowed to exotherm and then refluxed vigorously. Water of reaction is continuously moved by azeotropic distillation. After the water of reaction has been completely removed, the mixture is stripped of solvent under reduced pressure. There is obtained p-maleimidophenyltriethoxysilane based on method of preparation. The identity of the product is confirmed by its infrared spectrum.

EXAMPLE 5

There are added 33 parts of endomethylenetetrahydrophthalic anhydride to a mixture of 30 parts of γ-aminopropylmethyldimethoxysilane, 150 parts of anhydrous toluene, and two parts of pyridine. An exothermic reaction occurs immediately. The mixture is refluxed until all of the water formed during the reaction is removed. The mixture is then stripped of toluene under reduced pressure. Based on method of preparation, the product is γ-endomethylenetetrahydrophthalimidopropylmethyldimethoxysilane. Its identity is further confirmed by its infrared spectrum.

A mixture of 100 parts of a silanol terminated polydimethylsiloxane having an average of about 18 chemically-combined dimethylsiloxy units, 10 parts of the above silane, and 0.1 part of stannous octoate is heated at 80°C for about 10 hours. The viscosity of the mixture gradually increases. A product is obtained having a significantly higher molecular weight than the aforementioned silanol-terminated polydimethylsiloxane. Based on method of preparation, the product is a high molecular weight silanol terminated polydimethylsiloxane consisting essentially of chemically-combined blocks of polydimethylsiloxane joined together by γ-endomethylenetetrahydrophthalimidopropylmethylsiloxy units.

EXAMPLE 6

There was added a solution of 33 parts of endomethylenetetrahydrophthalic anhydride and 50 parts of anhydrous toluene to a mixture of 32 parts of δ-aminobutyldimethylmethoxysilane, 150 parts of anhydrous toluene and two parts of pyridine. An exothermic reaction resulted. The mixture was brought to reflux to effect the complete separation of water formed during the reaction. The mixture was then stripped of solvent under reduced pressure. There was obtained a brown, slightly viscous, liquid. Based on method of preparation, the product was δ-endomethylenetetrahydrophthalimidobutyldimethylmethoxysilane. Its identity was further confirmed by its infrared spectrum.

EXAMPLE 7

A mixture of the δ-endomethylenetetrahydrophthalimidobutyldimethylmethoxysilane of Example 5, and acetylchloride is heated at about 50°C for 4 days. The mixture is then stripped of by-product methylacetate, and excess acetylchloride under reduced pressure. Based on method of preparation, there is obtained δ-endomethylenetetrahydrophthalimidobutyldimethylchlorosilane. Its identity is confirmed by its infrared spectrum.

EXAMPLE 8

There are added 8.7 parts of ethylacetimidate to a mixture of 17 parts of the δ-endomethylenetetrahydrophthalimidobutyldimethylchlorosilane of Example 6, 100 parts of dry toluene and 10 parts of triethylamine. The mixture is refluxed for two hours. The mixture is filtered and stripped of solvent under reduced pressure. Based on method of preparation, there is obtained δ-endomethylenetetrahydrothalimidobutyldimethylethylacidimidatosilane. The identity of the product is further confirmed by infrared spectrum.

Although the above examples are limited to only a few of the very many imido-substituted organosilanes in the present invention and to methods of making them, it should be understood that the present invention is directed to a much broader class of such materials and methods which are set forth with greater particularity in the foregoing description.

We claim:

1. An imido-substituted organosilane of the formula

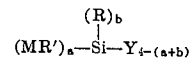

where R is selected from the class consisting of phenyl, chlorophenyl, naphthyl, tolyl, xylyl, methyl, ethyl, propyl, butyl, pentyl, hexyl, heptyl, octyl, vinyl, allyl, propenyl, cyclopentyl, cyclohexyl, cycloheptyl, cyclohexenyl, cyanoethyl, cyanopropyl and cyanobutyl; R' is selected from the class consisting of phenylene, xylylene, naphthylene, arthrylene, chlorophenylene, bromophenylene, chloronaphthylene, ethylenephenylene, ethylenexylylene, propylenephenylene, methylene, ethylene, propylene, butylene and pentylene; Y is a hydrolyzable radical selected from the class consisting of chloro, bormo iodo, fluoro, methoxy, ethoxy, propoxy, butoxy, phenoxy, methylamido, ethylamido, propylamido, ethyl acetimidato, methylpropionimidato, N,N-diethylaminoxy, N,ethyl-N,methyldiaminoxy, dipropyl N-aminoxy, methylamino, dimethylamino, ethylamino, diethylamino, propylamino, formoxy, acetoxy and propionoxy; M is an aliphatically unsaturated imido radical of the formula,

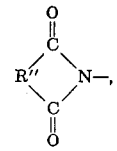

and R'' is an aliphatically unsaturated divalent organic radical selected from

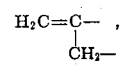

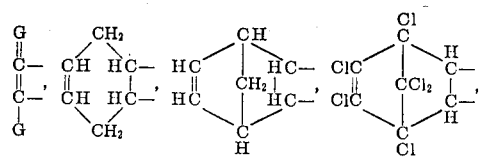

G is selected from the class consisting of hydrogen, halogen and methyl; $a$ is an integer equal to from 1 to 3 inclusive and $b$ is a whole number equal to 0 to 2 inclusive.

2. γ-maleimidopropyltriethoxysilane, in accordance with claim 1.

3. γ-maleimidopropyldimethylchlorosilane, in accordance with claim 1.

4. p-maleimidophenyltriethoxysilane, in accordance with claim 1.

5. γ-endomethylenetetrahydrophthalimidopropylmethyldimethoxysilane, in accordance with claim 1.

6. δ-endomethylenetetrahydrophthalimidobutyldimethylchlorosilane, in accordance with claim 1.

7. δ-endomethylenetetrahydrophthalimidobutyldimethylchlorosilane, in accordance with claim 1.

* * * * *